United States Patent [19]

Painter

[11] Patent Number: 4,941,861
[45] Date of Patent: Jul. 17, 1990

[54] INTERLOCKING SHAFT COUPLING

[75] Inventor: Robert A. Painter, Winchester, Mass.

[73] Assignee: Electronic Instrument & Specialty Corp., Stoneham, Mass.

[21] Appl. No.: 137,942

[22] Filed: Dec. 28, 1987

[51] Int. Cl.$^5$ ............................................. F16D 3/04
[52] U.S. Cl. ................................. 464/102; 464/147; 464/155
[58] Field of Search ............... 464/87, 92, 102, 104, 464/106, 147, 153, 155

[56] References Cited

U.S. PATENT DOCUMENTS

| | | | |
|---|---|---|---|
| 481,780 | 8/1892 | Brown | 464/102 |
| 1,072,282 | 9/1913 | Waninger | 464/102 X |
| 1,182,905 | 5/1916 | Hamilton et al. | 464/104 |
| 1,244,533 | 10/1917 | Morse | 464/104 X |
| 1,298,680 | 4/1919 | Dunham | 464/147 |
| 1,823,032 | 9/1931 | De Vlieg | 464/102 X |
| 2,297,619 | 9/1942 | Haberstump | 464/88 |
| 2,488,769 | 11/1949 | Engstrom | 464/102 X |
| 2,965,400 | 12/1960 | Lehman | 464/104 X |
| 3,128,611 | 4/1964 | Doran | 464/147 |

FOREIGN PATENT DOCUMENTS 2141520 12/1984 United Kingdom ............... 464/102

Primary Examiner—Daniel P. Stodola
Attorney, Agent, or Firm—Joseph S. Iandiorio; Brian M. Dingman

[57] ABSTRACT

An interlocking shaft coupling including a disk-shaped body having two end faces and an interlocking element disposed on each of these faces. Each interlocking element has a substantially circular cross section and a longitudinal axis parallel to a diameter of the disk-shaped body. The coupling can be attached to opposing rotary shafts by hubs which fit over the shafts and have receiving elements which engage with the interlocking elements of the shaft coupling.

6 Claims, 3 Drawing Sheets

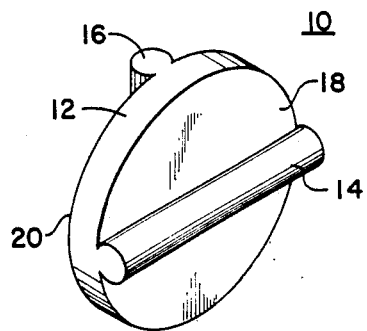
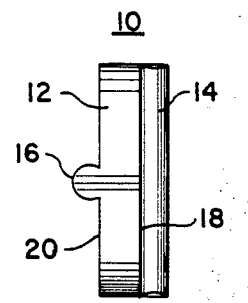
Fig. 1A
Fig. 1B
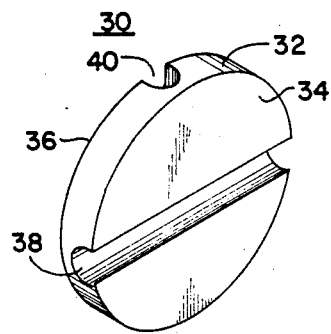
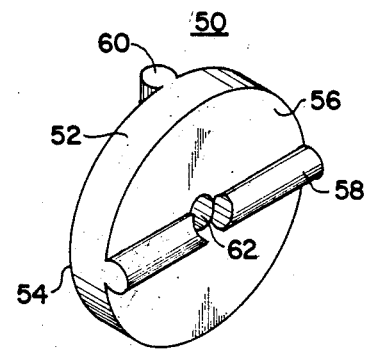
Fig. 2
Fig. 3

INTERLOCKING SHAFT COUPLING

FIELD OF INVENTION

This invention relates to an interlocking shaft coupling and more particularly to a coupling which provides interconnection of opposing rotary shafts that have a small amount of offset and/or angular misalignment.

BACKGROUND OF INVENTION

Flexible couplings or universal joints or more traditional Oldham couplings are typically used to interconnect opposing rotary shafts in photocopiers and other small business machines and instruments. The purpose of the coupling is to couple a motor to a driven device and to compensate for a limited amount of offset and/or angular misalignment between the shafts being connected. The compensation is performed in a universal joint by allowing rotational movement between the coupling members. However, because the coupling members are interlocked and cannot slide, universal joints cannot be used to interconnect shafts that are offset.

On the other hand, flexible couplings are most useful for interconnecting shafts that are angularly misaligned, as offset between the shafts causes strain on the coupling that can lead to fatigue and failure.

Non-interlocking couplings, for example Oldham couplings, are not useful because they are axially separable and thus may come apart during use, necessitating machine shut-down and coupling repair or replacement. In addition, Oldham couplings do not pivot and so cannot be used to compensate for angularly misaligned shafts.

These traditional shaft couplings are commonly made of two hub members, one being attached to each of the rotary shafts, and a center member which interconnects the two hub members. The hub members are normally made of metal. This provides strength, but adds to the cost because the metal must be machined. In addition, the hub member shaft hole is typically a round, drilled hole which may not exactly fit a variety of different shaft shapes and sizes. To accommodate these different shafts, the hub members typically include one or more set screws communicating with the shaft hole for ensuring a non-slip fit. Another problem with these metal couplings is that they transmit vibration from the motor to the driven device and also generate a relatively large amount of noise.

The center member of these traditional shaft couplings is often a cross piece which engages but does not lock with the hub members. These cross pieces are typically sized to fit relatively loosely in the hub members to allow for a small amount of angular misalignment or offset between the two opposing shafts.

Some improved center members are made of rubber. Due to their flexing, these rubber members provide some limited compensation for angular misalignment between shafts. They also cut down on transmitted vibration and noise. However, the soft rubber is subject to wear, which causes loosening and eventually leads to backlash problems. If the rubber pieces are made oversized or installed tightly to prevent these problems, they can lose some of their elasticity and create the noise and vibration problems inherent in the metallic center members.

SUMMARY OF INVENTION

It is therefore an object of this invention to provide a shaft coupling which interlocks and cannot be axially separated.

It is a further object of this invention to provide an interlocking shaft coupling which provides coupling of opposing shafts which are slightly offset.

It is a further object of this invention to provide an interlocking shaft coupling which provides coupling of opposing shafts that have a small amount of angular misalignment.

It is a further object of this invention to provide an interlocking shaft coupling with coupling pieces which slidingly engage to provide ease of assembly and disassembly.

It is a further object of this invention to provide an interlocking shaft coupling which can be molded to reduce fabrication costs.

It is a further object of this invention to provide an interlocking shaft coupling which is permanently self-lubricated.

It is a further object of this invention to provide an interlocking shaft coupling which cuts down on noise generation and transmitted vibration.

It is a further object of this invention to provide an interlocking shaft coupling which does not require set screws to hold a rotary shaft.

It is a further object of this invention to provide an interlocking shaft coupling which provides electrical and thermal isolation between opposing rotary shafts.

This invention results from the realization that a truly effective rotary coupling can be accomplished by providing a pair of transversely oriented joints that slide and pivot to compensate for minor shaft misalignment.

This invention features an interlocking shaft coupling which has a disk-shaped body having two end faces and an interlocking element disposed on each of these end faces. Each interlocking element is partially undercut and preferably has a substantially circular cross section and a longitudinal axis parallel to a diameter of the disk-shaped body. These diameters are preferably normal to each other. Preferably, each of the interlocking elements has a length in the direction of its longitudinal axis equal to the diameter of the body.

In a preferred embodiment, each of the interlocking elements includes a salient section formed as an integral part of the body. These salient sections preferably extend from the face of the body far enough to be undercut. Alternatively, each of the interlocking elements may include a recess formed in the body. In this embodiment, each of the recesses preferably extends from the face far enough to be partially undercut. In another alternative embodiment, the first interlocking element includes a salient section formed as an integral part of the body and the second interlocking element includes a recess formed in the body. Preferably, each of these interlocking elements extends from the face far enough to be partially undercut.

The interlocking shaft coupling preferably further includes a first cylindrical hub member having a recess in one of its two ends for receiving a rotary shaft and a receiving element on the other of its ends. The receiving element has a substantially circular cross section and a longitudinal axis parallel to a diameter of the hub member. This receiving element is shaped substantially as a complement to the first interlocking element to permit interlocking, sliding and rotational engagement with the first interlocking element. The interlocking shaft coupling also preferably includes a second cylindrical hub member having a recess in one of its two ends for receiving a rotary shaft and a receiving element on the other of its ends. This receiving element has a substantially circular cross section and a longitudinal axis parallel to a diameter of the hub member. The receiving element is shaped substantially as a complement to the second interlocking element to permit interlocking, sliding and rotational engagement with the second interlocking element.

Preferably, the receiving element of each of the cylindrical hub members includes a recess formed in the hub member and extending from its end far enough to be partially undercut. Alternatively, the receiving elements may include salient sections formed as an integral part of the hub member and extending from the end far enough to be partially undercut. The recessed receiving element may further include a protrusion on the center of the element extending toward the end of the hub member a distance of less than the radius of the receiving element.

Preferably, each of the hub members is made of plastic. Each hub member may further include an annular structural member for providing increased hoop strength. The hub members may also include at least one hole through the member communicating with the recess for receiving a set screw. These set screws provide more positive, non-slip contact between the hub member and the rotary shaft, and also elminate backlash between the shaft and the hub member.

Preferably, the shaft coupling is made of plastic, which may contain a dry lubricant to permanently self-lubricate the coupling. The shaft coupling also preferably includes a central hole through the disk-shaped body from one end face to the other and through each of the interlocking elements. This hole preferably has a diameter which is approximately the same as the diameter of the first interlocking element on the disk-shaped body.

An interlocking coupling for connecting two opposing rotary shafts according to this invention includes a disk-shaped center member having an interlocking element disposed on each of its two faces. Each of these elements has a substantially circular cross section and a longitudinal axis parallel to a diameter of the center member. These two axes are oriented at right angles. The coupling also includes two cylindrical hub members, each one having a recess for receiving a rotary shaft in one of its two ends and a receiving element on the other of its ends. The receiving element has a substantially circular cross section and a longitudinal axis parallel to a diameter of the hub member. The receiving element is shaped substantially as a complement to one of the interlocking elements to permit interlocking, sliding and rotational engagement with the center member.

Preferably, the center member has salient interlocking elements protruding from its faces far enough to be partially undercut. These elements preferably extend across the whole diameter of the center member. The center member also preferably includes a central hole bisecting each element. Each of the cylindrical hub members preferably includes a receiving recess shaped substantially as a complement to the salient interlocking elements to permit interlocking, sliding and rotational engagement between the center member and each of the hub members.

DISCLOSURE OF PREFERRED EMBODIMENT

Other objects, features and advantages will occur from the following description of a preferred embodiment and the accompanying drawings, in which:

FIG. 1A is an axonometric view of an interlocking shaft coupling according to this invention;

FIG. 1B is a side elevational view of the coupling of FIG. 1A;

FIG. 2 is an axonometric view of an alternative interlocking shaft coupling according to this invention;

FIG. 3 is an axonometric view of another alternative interlocking shaft coupling according to this invention;

Figure 4A:
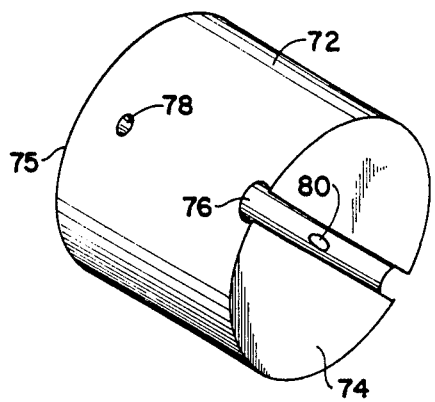
FIG. 4A is an axonometric view of a cylindrical hub member engageable with an interlocking shaft coupling according to this invention.

An interlocking shaft coupling according to this invention may be accomplished by providing a disk-shaped body having two end faces with an interlocking element on each of these end faces. Each of these interlocking elements is partially undercut, and preferably has a substantially circular cross section and a longitudinal axis parallel to a diameter of the disk-shaped body. Preferably, these elements have a cylindrical shape, but they may alternatively have a multi-faceted shape. The elements are preferably disposed at right angles. This shaft coupling allows coupling of opposing rotary shafts which have a small amount of offset and/or angular misalignment.

Preferably, each of the interlocking elements has a length equal to the diameter of the disk-shaped body. The interlocking elements may each be a salient section formed as an integral part of the body. Preferably, each salient section extends from the face of the body far enough to be partially undercut. The cylindrical shape and undercut provides the interlocking, sliding and pivoting engagement between members of the shaft coupling. Alternatively, each of the interlocking elements may include a recess formed in the disk-shaped body. This recess preferably extends into the body far enough to be partially undercut. In another alternative embodiment, one interlocking element may be a salient member and the other interlocking element may be a recess formed in the body. Each of these interlocking elements also preferably extends from the face of the disk-shaped body far enough to be partially undercut.

The interlocking shaft coupling also preferably includes a first cylindrical hub member having a recess in one of its two ends for receiving a rotary shaft. The hub member also has a receiving element on the other of its ends with a substantially circular cross section and a longitudinal axis parallel to a diameter of the hub member. The receiving element is shaped substantially as a complement to one of the interlocking elements on the disk-shaped body to permit interlocking, sliding and pivoting engagement with the interlocking element. The interlocking shaft coupling also preferably includes a second cylindrical hub member which is similar to the first cylindrical hub member except that its receiving element is shaped to receive the second interlocking element of the disk-shaped body.

The receiving element on each of the cylindrical hub members may include a salient section formed as an integral part of the hub member and extending from its end far enough to be partially undercut. Alternatively, each of the receiving elements may include a recess formed in the hub member and extending into the hub far enough to be partially undercut. This recess may further include a protrusion on the center of the element which extends toward the face of the hub member a distance of less than the radius of the receiving element. Each of these hub members is preferably made of plastic, and may include an annular structural member for providing increased hoop strength. Each of the hub members may also include at least one hole passing through the member communicating with the recess for receiving the rotary shaft. These holes are for set screws which help to hold the hub member tightly on the rotary shaft.

Preferably, the interlocking shaft coupling is made of plastic, which may include a dry lubricant. This dry lubricant permanently lubricates the shaft coupling, thereby removing the need for periodic lubrication. The interlocking shaft coupling may further include a central hole through the disk-shaped body and each of its interlocking elements. The diameter of this hole is preferably approximately the same as the diameter of the interlocking elements. This hole provides a more uniform cross-sectional thickness of the disk-shaped body, thereby decreasing warping during molding of the disk-shaped body. This hole may also receive a small protrusion of the hub member it is engaged with. This protrusion limits the amount of sliding between the disk-shaped body and the hub member to prevent separation during rotary operation.

Preferably, the interlocking elements on the center member are salient sections, and the center member includes a hole passing through its center. The hub members which engage with this center member each preferably have a receiving recess which is substantially complementary to the salient sections. This complementary undercut shape provides interlocking, sliding and pivoting engagement with the center member.

There is shown in FIG. 1A an interlocking shaft coupling 10 which includes a disk-shaped body 12 with end faces 18 and 20. Salient interlocking elements 14 and 16 are formed on each of these faces. Each of these elements 14 and 16 has a substantially circular cross section and lies along a diameter of the body. Elements 14 and 16 are disposed at right angles to each other, and are each as long as the diameter of body 12.

The salient interlocking element is shown in more detail in FIG. 1B. Here, element 16 is shown end-on. It can be seen that element 16 extends from face 20 of body 12 a distance of more than its radius but less than its diameter. As long as element 16 extends a distance of more than its radius, it will be partially undercut. This undercut provides the interlocking feature which prevents axial coupling separation during rotary operation. Elements 14 and 16 provide the interlocking, sliding and pivoting engagement of the shaft coupling which compensates for small amounts of angular misalignment and/or offset between opposing rotary shafts.

Salient interlocking element 14 is disposed at right angles to element 16. This right angle orientation provides the most efficient way to drive the coupling. FIG. 1B also serves to show that each of the elements 14 and 16 is preferably as long as the diameter of body 12.

An alternative way of forming the interlocking elements is shown in FIG. 2. Shaft coupling 30 includes disk-shaped body 32 with end faces 34 and 36. Interlocking elements 38 and 40 are disposed on each of these faces respectively. Elements 38 and 40 are recesses having a substantially circular cross section and extending from the face into the body far enough to be partially undercut. As in the embodiment of FIGS. 1A and 1B, each of these elements extends across the whole face, and the two elements lie at right angles to each other.

A molded plastic interlocking shaft coupling 50 is shown in FIG. 3. Coupling 50 includes a disk-shaped body 52 with end faces 56 and 54. Each interlocking element 58 and 60 is a salient element protruding from the face of body. This embodiment includes a central hole 62 which passes through body 56 and each of the elements 58 and 60. This hole is approximately the same diameter as each of the elements 58 and 60, and serves two purposes. First, the hole improves the flatness of shaft coupling 50. This is so because coupling 50 is molded from a plastic material. When plastic is molded, areas with different cross-sectional thicknesses typically cure at different rates. The center of coupling 50 where hole 62 is located would be about one and one-half times as thick as any other part of the coupling if the hole was not there. This would cause parts of coupling 50 to cure at different rates, which could cause the coupling to warp during curing. A warped coupling would not mesh properly with the opposing coupling member, which would cause it to wear quickly.

The second advantage of hole 62 is that the cylindrical hub members with which coupling 50 mates typically have a small protrusion which extends from the hub member a distance of less than the radius of interlocking elements 58 and 60. This protrusion helps prevent sliding disengagement between the shaft coupling 50 and a cylindrical hub member, while still allowing sliding relative movement between the two. This positive locking feature ensures the interlocking engagement which is one of the advantages of the shaft coupling.

Figure 4B:
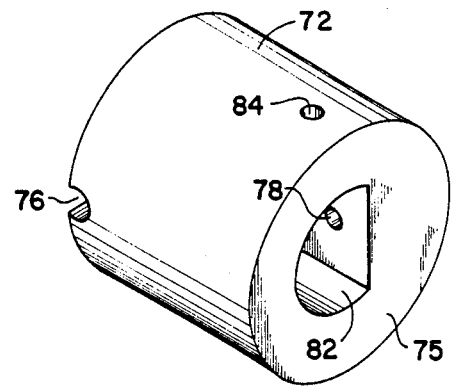
FIG. 4B is a rear axonometric view of the hub member of FIG. 4A.
Figure 4C:
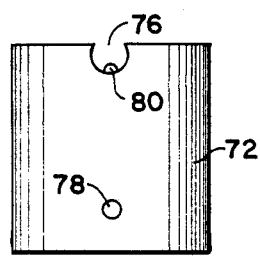
FIG. 4C is a side elevational view of the hub member of FIG. 4A.
Figure 5:
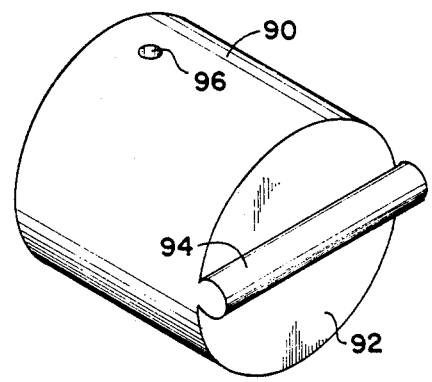
FIG. 5 is an axonometric view of an alternative cylindrical hub member.
Figure 6:
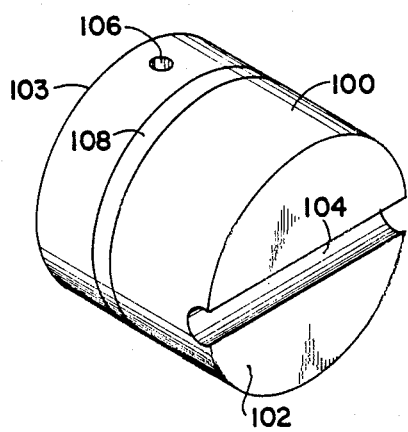
FIG. 6 is an axonometric view of another alternative cylindrical hub member.

Several embodiments of a cylindrical hub member for mating with the shaft coupling and providing an attachment to a rotary shaft are shown in FIGS. 4–6. Cylindrical hub member 72, FIG. 4A, includes a receiving element 76 on one of its ends 74. Receiving element 76 has a substantially circular cross section and is shaped as a complement to an interlocking element on the disk-shaped body, for example element 58, FIG. 3. Receiving element 76 also includes central protrusion 80 which fits in hole 62, FIG. 3, to prevent shaft coupling 50 from sliding out of receiving recess 76 and disengaging with hub member 72.

Hub member 72 has a second end face 75 with nearby set screw hole 78. This end of the hub member is shown in more detail in FIG. 4B. Hub member 72 actually includes two set screw holes 78 and 84 which communicate with recess 82 in end face 75. Recess 82 is shaped to closely fit the size and shape of a rotary shaft to which it is to be connected. Set screws, not shown, passing through set screw holes 78 and 84 ensure a non-slip fit between the rotary shaft and the hub member 72.

Protrusion 80 is shown in more detail in FIG. 4C. Receiving recess 76, which is shaped substantially as a complement to an interlocking element of the shaft coupling, for example element 58, FIG. 3, is partially undercut. This allows sliding engagement between the shaft coupling and the hub member. Once the two are engaged, they can slide and pivot relative to one another because of the circular, undercut shape of the interlocking elements. Protrusion 80 extends part way into hole 62, FIG. 3, and prevents coupling 50 from disengaging with hub member 72 by sliding all the way out. However, hole 62 is large enough to allow coupling 50, FIG. 3, to slide relative to hub member 72. This limited sliding engagement provides the play necessary for coupling of opposing rotary shafts with a limited amount of offset and/or angular misalignment.

A hub member designed to be used with the shaft coupling of FIG. 2 is shown in FIG. 5. Hub member 90 includes receiving element 94 protruding from end face 92. Element 94 is a salient, cylindrical member with a circular cross section, and is shaped as a complement to one of the interlocking elements 38 or 40 of shaft coupling 30, FIG. 2. This hub member also includes at least one set screw hole such as hole 96.

To increase the hoop strength of the cylindrical hub members, annular structural member 108, FIG. 6, may be added. Structural member 108 is a metallic ring which encircles and fits tightly around hub member 100. This structural member is especially useful on the end of the hub member which receives the rotary shaft, for instance end 103, because the walls of this section are relatively thin. Hub member 100 also includes a set screw hole 106 for receiving a set screw, which ensures a non-slip fit to the rotary shaft. Receiving element 104 is shaped to closely fit a shaft coupling interlocking element such as element 58, FIG. 3.

Figure 7:
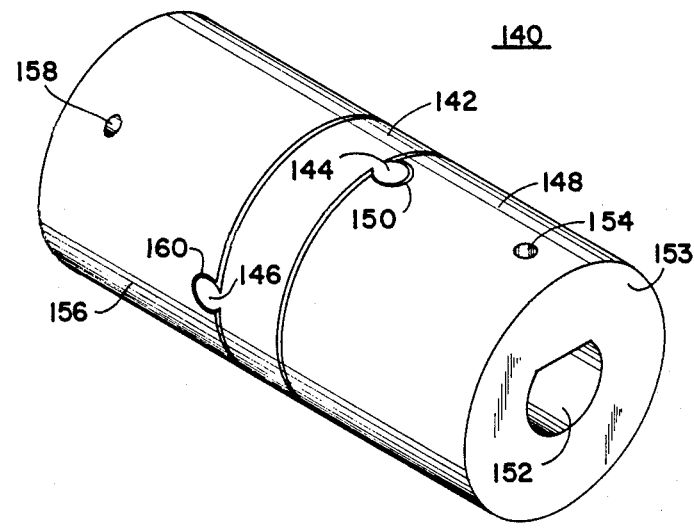
FIG. 7 is an axonometric view of an interlocking shaft coupling for connecting two opposing rotary shafts according to this invention.

An interlocking coupling for connecting two opposing rotary shafts is shown in FIG. 7. Coupling 140 includes disk-shaped center member 142 and cylindrical hub members 156 and 148. Center member 142 has cylindrical interlocking elements 144 and 146 on its two faces. These elements have a substantially circular cross section and extend from the face far enough to be partially undercut. Hub members 148 and 156 have receiving elements 150 and 160, respectively, for receiving the interlocking elements of center member 142. These receiving elements are shaped substantially as complements to the interlocking elements and allow sliding and pivoting relative movement between center member 142 and each of the hub members 148 and 156. This relative movement allows coupling 140 to compensate for the angular misalignment and/or offset between the opposing rotary shafts that coupling 140 interconnects.

Hub member 148 has D-shaped recess 152 in end 153. Member 148 also includes set screw hole 154, which communicates with recess 152. Since hub members 148 and 156 are molded from a plastic material, each can be designed to fit the shape and size of virtually any rotary shaft. In this case, hub member 148 has been designed to closely fit a relatively small D-shaped rotary shaft, not shown. This unique shaft hole provides a close, non-slip fit to the rotary shaft.

Center member 142 is preferably molded from a plastic material which contains a dry lubricant such as molybdenum disulfide. This dry lubricant provides permanent lubrication and obviates the necessity of periodic re-lubrication of the coupling. Hub members 148 and 156 may also be molded of a plastic containing a dry lubricant.

Figure 8:
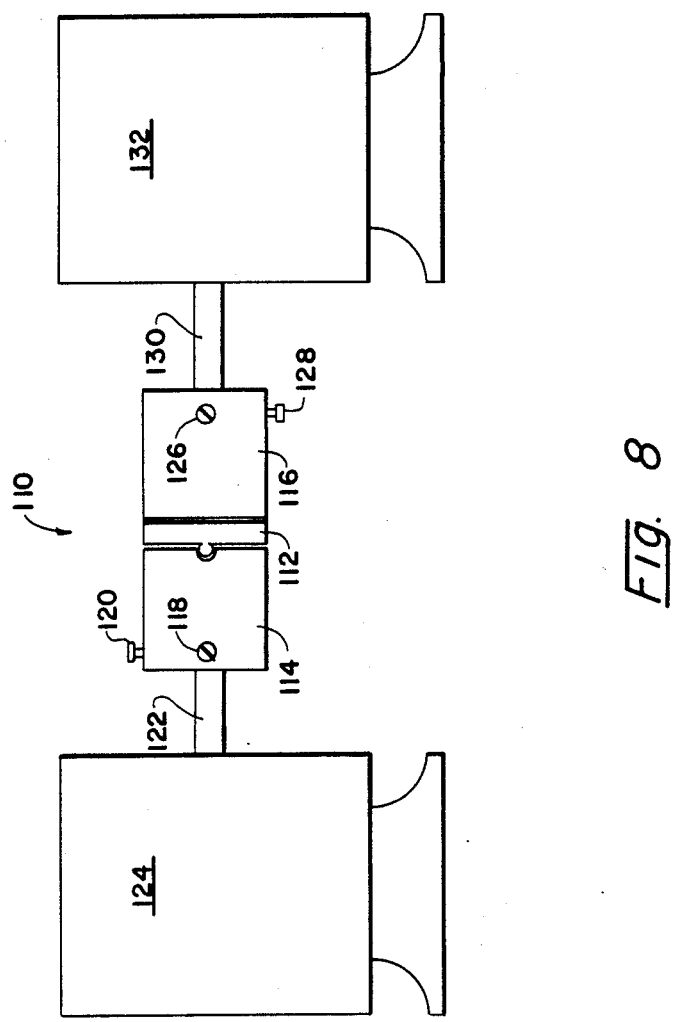
FIG. 8 is a schematic diagram of the interlocking shaft coupling of FIG. 7 in use.

The interlocking coupling is shown being used to connect two opposing rotary shafts in FIG. 8. Coupling 110 connects rotary shaft 130 of motor 132 to rotary shaft 122 of driven device 124. Coupling 110 includes disk-shaped center member 112 and cylindrical hub members 114 and 116. Set screws 118, 120, 126 and 128 provide a positive, non-slip fit to rotary shafts 122 and 130. Coupling 110 allows efficient driving of device 124 through rotary shaft 122 and is useful to interconnect shafts which have up to one-half degree of angular misalignment and up to one millimeter of linear offset. Coupling 110 also provides quiet, vibration-free coupling, which is especially desirable in small office machines. Since coupling 110 is made of plastic, it also provides electrical and thermal isolation between motor 132 and driven device 124.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. A three piece interlocking coupling for connecting two opposing rotary shafts, comprising:

a plastic disk-shaped center member having two substantially identical salient interlocking elements protruding therefrom, one from each of its two faces, each said element having a substantially circular cross section and a longitudinal axis parallel to a diameter of said center member, each said axis oriented at right angles to the other of said axes, each said element protruding from said face far enough to be partially undercut and having a central hole bisecting said element and said longitudinal axis, said central hole having a diameter substantially the same as the diameter of said salient interlocking element for reducing the thickness of said center member where said salient interlocking elements cross to reduce warpage upon curing of the plastic;

first and second plastic cylindrical hub members, each said hub member having a recess for receiving a rotary shaft in one of its ends and a receiving recess in the other of its ends having a substantially circular cross section and a longitudinal axis parallel to a diameter of said hub member, said receiving recess shaped substantially as a complement to said interlocking elements to permit interlocking, sliding, and pivoting engagement with said center member; and a protruding member integrally formed in the center of the receiving recess in at least one of said hub members, said protruding member having a width of less than the diameter of said central hole and protruding a distance of less than the radius of said salient interlocking elements for limiting the movement of said interlocking element in said receiving recess.

2. The interlocking shaft coupling of claim 1 in which each of said interlocking elements has a length in the direction of its longitudinal axis substantially equal to the diameter of said body.

3. The interlocking shaft coupling of claim 1 in which said plastic contains a dry lubricant.

4. The interlocking shaft coupling of claim 1 in which said first hub member includes an annular structural member for providing increased hoop strength.

5. The interlocking shaft coupling of claim 1 in which said second hub member includes an annular structural member for providing increased hoop strength.

6. The interlocking shaft coupling of claim 1 in which at least one of said hub members includes at least one hole through said member communicating with said recess for receiving a set screw.

* * * * *